(12) United States Patent
Fassbender et al.

(10) Patent No.: US 8,960,797 B2
(45) Date of Patent: Feb. 24, 2015

(54) LATCH FITTING FOR LOCKING TWO VEHICLE COMPONENTS

(75) Inventors: Frank Fassbender, Coburg (DE); Oliver Steffen, Coburg (DE)

(73) Assignee: Brose Fahrzeugteile GmbH & Co. KG, Coburg, Coburg (DE)

(*) Notice: Subject to any disclaimer, the term of this patent is extended or adjusted under 35 U.S.C. 154(b) by 792 days.

(21) Appl. No.: 13/175,539

(22) Filed: Jul. 1, 2011

(65) Prior Publication Data
US 2012/0009007 A1  Jan. 12, 2012

(30) Foreign Application Priority Data
Jul. 8, 2010  (DE) .......................... 10 2010 031 119

(51) Int. Cl.
*B60N 2/235*  (2006.01)

(52) U.S. Cl.
CPC .................. *B60N 2/2356* (2013.01)
USPC ...................................................... 297/367 L

(58) Field of Classification Search
CPC .................................................. B60N 2/2356
USPC .............................. 297/367 R, 367 P, 367 L
See application file for complete search history.

(56) References Cited

U.S. PATENT DOCUMENTS

| 4,143,905 | A | * | 3/1979 | Hensel et al. ............. 296/65.17 |
| 5,216,936 | A | * | 6/1993 | Baloche .......................... 74/527 |
| 5,755,491 | A | * | 5/1998 | Baloche et al. ............... 297/362 |
| 6,561,585 | B2 | | 5/2003 | Cilliere et al. |
| 6,749,263 | B2 | | 6/2004 | Peters |
| 7,341,311 | B2 | | 3/2008 | Ohba |
| 7,360,838 | B2 | | 4/2008 | Smuk |
| 2004/0036338 | A1 | | 2/2004 | Lardais et al. |
| 2006/0145523 | A1 | | 7/2006 | Yamada |
| 2009/0302658 | A1 | | 12/2009 | Fassbender et al. |

FOREIGN PATENT DOCUMENTS

| DE | 101 15 034 A1 | 10/2001 |
| DE | 100 42 169 B4 | 3/2002 |
| DE | 103 29 848 A1 | 2/2004 |
| DE | 10 2006 009 976 A1 | 9/2006 |
| DE | 10 2008 018 624 B3 | 10/2009 |
| EP | 1 353 819 B1 | 10/2003 |
| EP | 1 674 332 A1 | 6/2006 |
| EP | 1 818 210 B1 | 8/2007 |

* cited by examiner

*Primary Examiner* — Sarah B McPartlin
(74) *Attorney, Agent, or Firm* — Christie, Parker & Hale, LLP

(57) ABSTRACT

A latch fitting for locking two components includes a first fitting part and a second fitting part. At least one locking bolt is movably arranged on the first fitting part and is guided on at least one longitudinally extended guide element along an adjustment track. The guide element includes an end that faces toothing of the second fitting part. A drive element is coupled to the at least one locking bolt for moving the at least one locking bolt along the adjustment track to lock the latch fitting with the toothing of the second fitting part. The at least one guide element includes a stop for limiting the adjustment track of the at least one locking bolt when moving the at least one locking bolt against the locking direction.

9 Claims, 6 Drawing Sheets

LATCH FITTING FOR LOCKING TWO VEHICLE COMPONENTS

CROSS-REFERENCE TO RELATED APPLICATION

Figure 1:
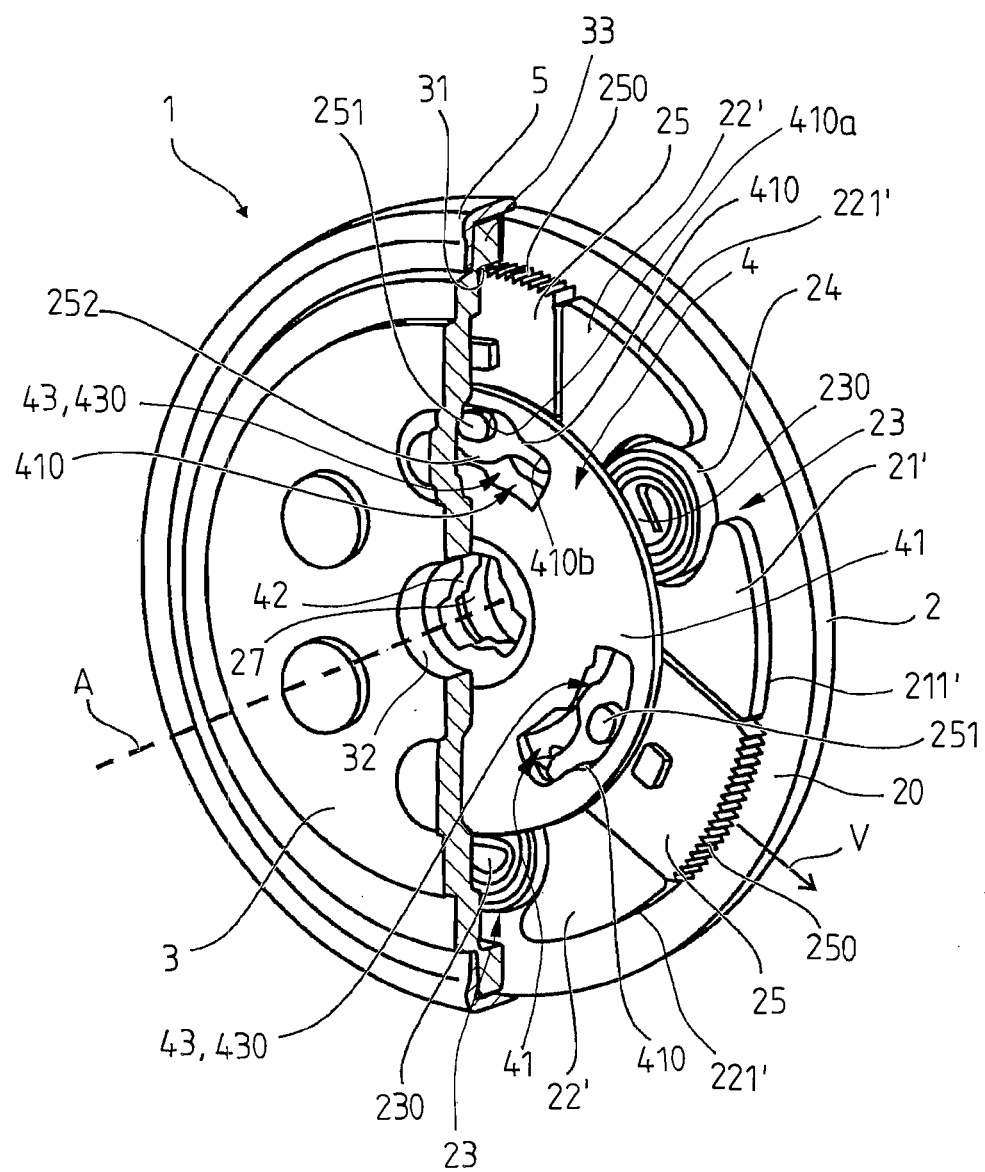

This application claims priority to and the benefit of German Patent Application No. 10 2010 031 119.7, filed on Jul. 8, 2010, the entire contents of which are incorporated herein by reference.

The invention relates to a latch fitting for locking two vehicle components.

Such a latch fitting comprises a first fitting part and a second fitting part rotatably arranged about a rotational axis. A toothing is formed on the second fitting part with which one or multiple locking bolts arranged on the first fitting part can engage for locking the latch fitting. A longitudinally extended guided element is arranged on the first fitting part for each locking bolt for guiding the locking bolt on the first fitting part, wherein said guide element movably guides the locking bolt along an adjustment track and comprises according to its longitudinal extension an end facing towards the toothing of the second fitting part and an end facing away from the toothing of the second fitting part.

A drive element coupled to the locking bolts is provided for actuating the locking bolt. This drive element is formed to move the locking bolts along the adjustment track in locking direction in order to engage the locking bolts with the toothing of the second fitting parts, for latching the first fitting part with the second fitting part, namely for locking the latch fitting, or to move the locking bolts against the locking direction in order to move the locking bolts for unlocking the latching without engagement with the toothing of the second fitting part.

The drive element can comprise for instance a cam disc and a crank disc, which interact in order to actuate the locking bolts. The drive element can be hereby provided in one piece (with integral cam disc and crank disc) or in two pieces (cam disc and crank disc provided separately, which are connected with each other torque-proved, for instance form-fit).

Such a latch fitting can be for instance used as a fitting for adjusting two vehicle seat components to each other, for instance for adjusting the slope of a backrest relatively to a seat component of a vehicle seat.

In case of such a latch fitting, a drive element is conventionally stored with a radial clearance to the rotational axis and therefore movable in radial direction at least by a clearance relative to the first and/or second fitting part (also designated as "floating mounting" of the drive element). This occurs in order to compensate tolerances, for instance in the production of the locking bolts, and to ensure that in the locked position of the latch fitting (in which the locking bolts are in their locked position) all locking bolts are securely engaged with the toothing of the second fitting part and that not one or multiple locking bolts are not or only partially engaged due to tolerances.

However, due to such an exemplary mounting of the drive element, it is provided that the drive element and together with the drive element the locking bolts coupled to the drive element can be moved in radial direction relative to the second fitting part at least by a pre-determined path, if the locking bolts are not in their locked position. This effects that when transferring the latch fitting into its unlocked status the assembly consisting of the drive element and the locking bolts coupled to the drive element can move relative to the second fitting part at least by a certain clearance in radial direction so that during the transfer process one or multiple locking bolts could possibly again engage with the toothing of the second fitting part due to a radial movement of the drive element. This can have the consequence that during an unlocking process one or multiple locking bolts can slide due to such a radial movement of the drive element within its floating mounting in a ratchet manner over the toothing of the second fitting part, what could cause damage to the locking bolts or to the second fitting part.

This problem exists in particular in a latch fitting, which uses locking bolts realizing a so-called double-contact point. In case of a latch fitting, known from the EP 1353819 B1, exactly two locking bolts are arranged in a radial movable manner on a first fitting part, which comprise in each case two contact points arranged on an end of each locking bolt, which rest slidably against a cam disc of a drive element and via which the locking bolts are pressed radially outward for locking and are kept in engagement with the toothing of the second fitting part. The two contact points of each locking bolt being mutually shifted in circumferential direction provide two supporting points for abutment with the cam disc (that's why "double-contact point") via which in particular a loading force acting in circumferential direction about the rotational axis of the locking bolt can be better supported so that a tilting of the locking bolt is counteracted due to a loading force acting in circumferential direction.

In case of the locking bolts, known from the EP 1353819 B1, the contact points realizing a double-contact point are arranged on external lateral edges of the locking point in circumferential direction, what maximizes the distance between the contact points in circumferential direction.

Since two contact points are provided on each locking bolt, which are completely supported by the cam disc of the drive element, the circumferential surface being available at the cam disc is reduced, which is conventionally used in other latch fittings also for centering support of the drive element during an actuating process and therefore for reducing the radial clearance due to the floating mounting.

Furthermore, in case of conventional latch fittings the locking bolts have in fact a defined locked position (in which they are moved radially outward and are in engagement with the toothing of the second fitting part), however no mechanically unlocked position defined at the first fitting part. In case of the latch fitting of EP 1 353 819 B1 two locking bolts are for instance guided in each case between two guide elements, wherein the adjustment track of the locking bolts is limited radially outwards by the toothing of the second fitting part, wherein however the locking bolts are only supported radially inwards by the drive element. If the locking bolts were being disengaged with the toothing of the second fitting part, they are thus solely kept via the drive element, what can provide in case of a floating mounting of a drive element optionally—if no further measures for suppressing the radial clearance of the drive element in unlocked position are provided—a radial clearance of the locking bolts in the unlocked position of the latch fitting.

Since the locking bolts in case of the latch fitting of the EP 1 353 819 B1 have no unlocked position mechanically defined on the first fitting part, and their adjustment track is not limited radial inwards by the guide elements on the first fitting part, also the assembly of the locking bolts on the first fitting part is being more complicated. This is because when arranging the locking bolts on the first fitting part a sliding through of the locking bolts between the guide elements has to be prevented such that they for instance are kept manually or by using additional holding means in a position in which they can be connected to the drive element, in particular a crank disc of the drive element.

In case of a latch fitting known from the DE 10 2006 009 976 A1 locking bolts are supported by a cam disc via in each case two contact points forming a double-contact point. Each locking bolt comprises on its end facing away from the contact points additionally a section with a width enlarged relative to a main section, on which a toothing is formed for engagement with the toothing of the second fitting part. The main section serves hereby for radial guiding the locking bolt on the first fitting part, while the section with a larger width effects that a toothing elongated in circumferential direction can be provided on the locking bolt so that the engagement of the locking bolt with the toothing of the second fitting part is improved.

The object of the present invention is to provide a latch fitting of the previously mentioned kind, which also provide when using a double-contact point the possibility for a sufficient support of the drive element in order to reduce the risk during an unlocking process that the locking bolts could again engage due to the radial clearance of the drive element with the toothing of the second fitting part and which also allows for a simple assembly and a defined arrangement of the locking bolt on the corresponding first fitting part.

This object is being solved by a device described as follows.

Thereby it is provided that the at least one guide element comprises on the end facing away from the toothing of the second fitting part a stop for limiting the adjustment track of the at least one locking bolt when moving the at least one locking bolt against the locking direction.

Providing such a stop at the end of the guide element offers several advantages.

Since a stop is provided on the end of the at least one guide element facing away from the toothing of the second fitting part, the adjustment track of the locking bolt corresponding to the guide element is limited when moving away from the toothing of the second fitting part. The locking bolts of the latch fitting can therefore only move on the first fitting part between a locked position, in which they engage with the toothing of the second fitting part, and a position, in which they are in abutment with the corresponding fitting part. This provides that each locking bolt has a defined final stop on the first fitting part, which mechanically defines a final position in the unlocked status for the locking bolt.

By providing such a stop—as explained in more detail in the following—in case of a latch fitting having multiple locking bolts the radial clearance of the drive element and the locking bolts coupled to the drive element due to the floating mounting of the drive element is at least reduced, if the locking bolts approach during an unlocking process the assigned stops.

By providing the stop also the assembly of the locking bolts on the first fitting part is thus simplified since when attaching the locking bolts to the first fitting part, the locking bolts can not slide through but are kept by stops and can be connected in this position to the drive element by for instance applying form fitting elements provided on the locking bolts in form of pins or such in cranks of the crank disc of the drive element.

For instance, two guide elements can be assigned to each locking bolt, which comprise bolt guide sections continuing parallel to each other between which the at least one locking bolt is guided. The guide elements can comprise in this case for forming stops at its ends facing away from the toothing of the second fitting part end sections being adjacent to the bolt guide sections, which in the unlocked end position get into abutment with the respective assigned locking bolt in a plane manner and define in this manner the end position for the locking bolt.

Since the end sections for providing stops at the end of the guide elements facing away from the toothing of the second fitting part are provided, the stops are removed by a maximum possible distance from the toothing of the second fitting part. This provides that in case of loading, in which forces act in circumferential direction on the locking bolts, beneficial lever ratios for supporting the locking bolts exist. Due to the arrangement of the stop on the end of each guide element facing away from the toothing of the second fitting part, the bolt guide section for guiding and supporting can extend over the full length of the guide element until the end of the guide element facing away from the toothing of the second fitting part and can therefore support the loading force over its full length. A large lever arm is provided between a supporting point of the locking bolt on a cam disc of the drive element and the end of the locking bolt being engaged with the toothing of a second fitting part, on which the loading forces strike.

The end sections can be at least sectionally curved or can also form steps for abutment with the locking bolt. By providing the end sections, which form the elongation of the bolt guiding sections continuing parallel to each other for radial guidance of the locking bolt, on the end of the guide elements facing away from the toothing of the second fitting part for plane abutment with the locking bolts, it is achieved that the locking bolts can only be moved into an end position on the first fitting part and can get into a plane abutment with the end sections when approaching the end position.

The end sections can be for instance formed by curved surfaces on the guide elements, which are formed such that an adjustment track formed between the guide element tapers in direction away from the toothing of the second fitting part.

The latch fitting can comprise one or multiple locking bolts, for instance three locking bolts, wherein at least one of the locking bolts is guided on the guide elements, which comprise stops of the mentioned kind. Advantageously, all locking bolts of the latch fitting are thereby identical in construction and are guided on identical constructed guiding elements. It is also conceivable to arrange only one or a part of a locking bolt on such guide element provided with stops.

The toothing on the second fitting part is preferably formed as internal toothing and the locking bolts are engaged in a locked position in a radial outward setting with the internal toothing of the second fitting part. The locking bolts are thereby radial movably arranged on the first fitting part and can be moved for unlocking the latch fitting radially inwards to disengage with the toothing of the second fitting part. The stop of a guide element is formed in this case on a radial internal end of the longitudinally extended guide element.

Each locking bolt can have on its end facing away from the toothing of the second fitting part abutment sections for plane abutment with the stops on the guide elements of the first fitting part, wherein said abutment sections are adapted by a in particular curved design of the shaping of the end sections.

The locking bolts comprise preferably on lateral edges two guiding sections continuing parallel to each other for interacting with two guide elements housing the at least one locking bolt between them, wherein in each case an abutment section is adjacent to the end of each locking bolt facing away from the toothing of the second fitting part on a guiding section. The lateral edges of a locking bolt serve thereby almost along their full length of the sliding guidance on the guiding elements housing the locking bolts between them. The abutment sections for abutment with the end sections of the guide elements are arranged on the end of the locking bolt facing away from the toothing of the second fitting part and therefore on the end of the locking bolt, without impairing the sliding guidance of the locking bolt on the guide elements.

The curved abutment sections arranged on the end on the locking bolt can be additionally formed such that they provide lead in slopes, which alleviate the assembly of the locking bolts on the first fitting part. Due to the tapering of each locking bolt at their ends by the means of the abutment sections formed in curves the locking bolts can be attached in an easy manner to the guiding track formed between the guiding elements or can be moved into the guiding track.

If the drive element is mounted with radial clearance relative to the rotational axis on the first fitting part and/or the second fitting part (so called "floating mounting" of the drive element) and if the latch fitting comprises at least two locking bolts then the radial clearance of the drive element is limited by providing stops limiting the adjustment track of each locking bolt on the corresponding guiding elements, if at least one of the locking bolts is in abutment with an assigned stop of a guiding element. The background hereby is that during an unlocking process of the latch fitting the locking bolts can be pulled by actuating the drive element in radial direction out of engagement with the toothing of the second fitting part and therefore the assemblage consisting of the drive element and the locking bolts coupled to the drive element is radially movable due to the floating mounting of the drive element. By providing the stops on the guiding elements assigned to the respective locking bolts this radial movement is however limited so that none of the locking bolts coupled to the drive element can again get into engagement with the toothing of the second fitting part, when the locking bolts were moved by actuating the drive element in a radially inwards moved unlocked position and at least one of the locking bolts is in abutment with the assigned stop (or the assigned stops).

In other words, the stops are made such that the assemblage consisting of locking bolts and drive element is retained by a radial movement due to the floating mounting having a clearance due to the fact that at least one of the locking bolts gets into abutment with the corresponding stop during a radial movement of the drive element. The stops limit then, when the locking bolts are sufficiently far removed from the toothing of the second fitting part in their unlocked position and are approximate to the respective corresponding stop (or the corresponding stops), the maximal radial clearance of the assemblage consisting of drive element and locking bolts such that the locking bolts cannot again engage with the tooting of the second fitting part at least due to the radial clearance (this is only possible via an actuation of the drive element for locking).

For instance, in case of an essentially lateral aligned latch fitting during a radial movement of the drive element relative to the fitting parts downwards an upper locking bolt can be pulled together with the drive element downwards until said bolt comes into abutment with the corresponding stop and is thereby retained, whereby the drive element and also the remaining locking bolts coupled to the drive element cannot move further downwards. In this manner, the locking bolts are retained and cannot engage in their unlocked position due to the floating mounting of the drive element with the toothing of the second fitting part.

The previously described measures can be advantageously used in case of a latch fitting, in which each locking bolt interacts via two contact points of the kind of a double contact point mutually shifted in circumferential direction about the rotational axis with a cam disc of the drive element. When using such locking bolts the circumferential surface of the cam disc applicable for the centering of the cam disc is reduced since the circumferential surface of the cam disc is required for acting on the contact points of the locking bolts. In order to achieve hereby a support of the drive element for limiting the radial clearance due to the floating mounting, the stops are provided on the guiding elements for limiting the radial adjustment track of the driving element.

The contact points mutually shifted in circumferential direction are in abutment in the locked position of the locking bolt in each case with a radial outer cam section of a cam disc of the drive element and are kept via these cam sections in engagement with the toothing of the second fitting part. The cam disc is then rotated for actuating the latch fitting, through which the contact points slide along an outer guiding contour of the cam disc and are pulled for instance by coupling to a crank disc out of engagement with the toothing of the second fitting part.

The contact points of the at least one locking bolt are preferably arranged on the end of the locking bolt facing away from the toothing of the second fitting part and are adjacent to abutment sections, which are provided for abutment with the stops on the guide elements arranged on both sides of the locking bolt. The abutment sections are thereby preferably provided on the outside of the pin-like contact points, namely in the area of edges of the contact points being external in circumferential direction.

In a preferred modification the contact points realizing the double contact point are shifted inwards along the circumferential direction relative to the external edges of the locking bolt as the contact points comprise in circumferential direction in each case a distance to the external, lateral guiding sections of the locking bolt. Due to the shifting of the contact point inwards the lever ratios can be optimized on the one hand for supporting the locking bolt via the contact points at a cam disc of the drive element and on the other hand for supporting the locking bolt at the guide elements during the loading acting on the locking bolt in circumferential direction.

In a concrete arrangement each contact point of a locking bolt can be arranged in circumferential direction for instance approximately in the centre between an actuating element arranged on a radial centre line of the locking bolt for coupling the locking bolt to the drive element and a lateral guiding section of the locking bolt being external in circumferential direction.

Figure 2A:
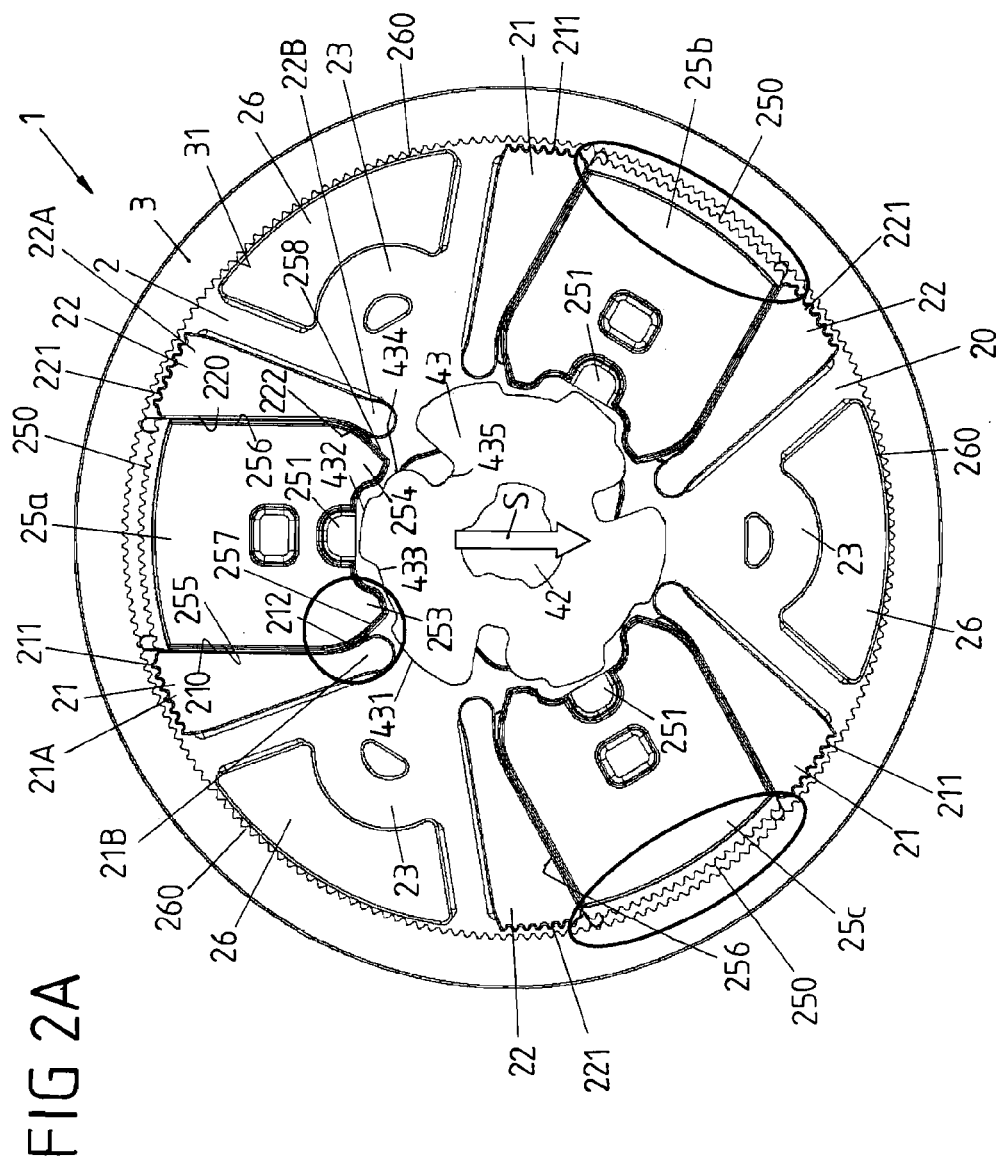
Figure 2B:
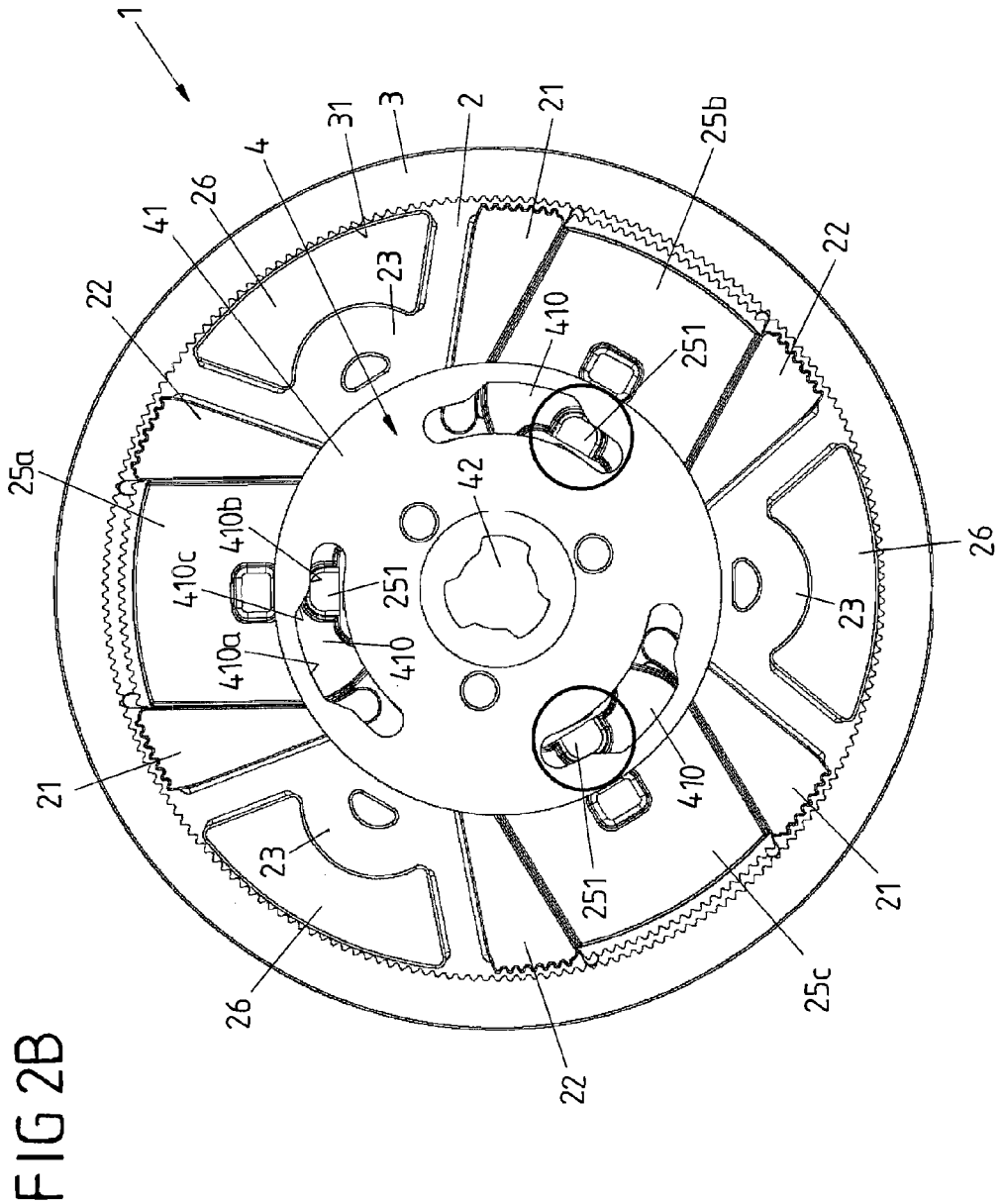
Figure 3A:
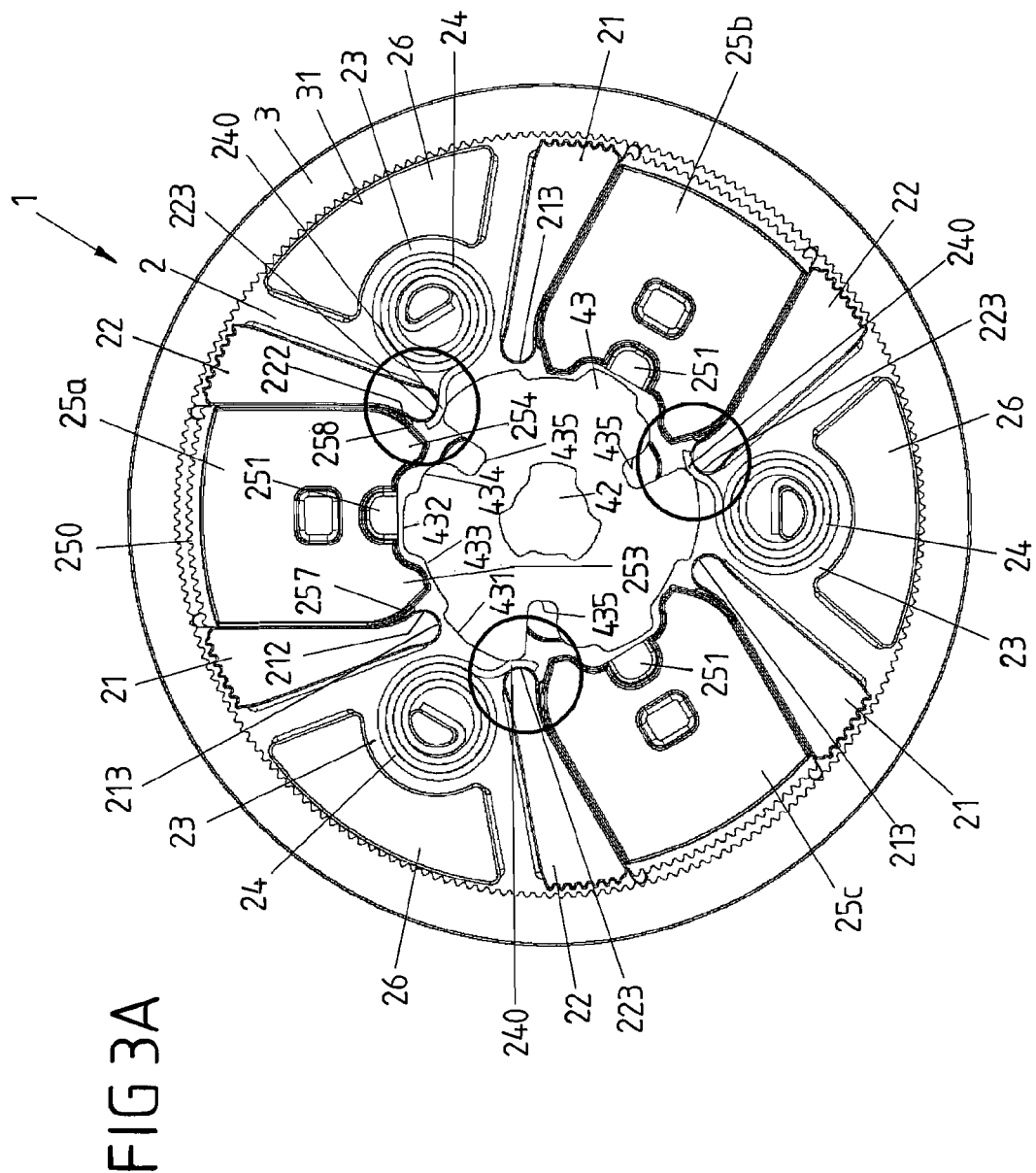
Figure 3B:
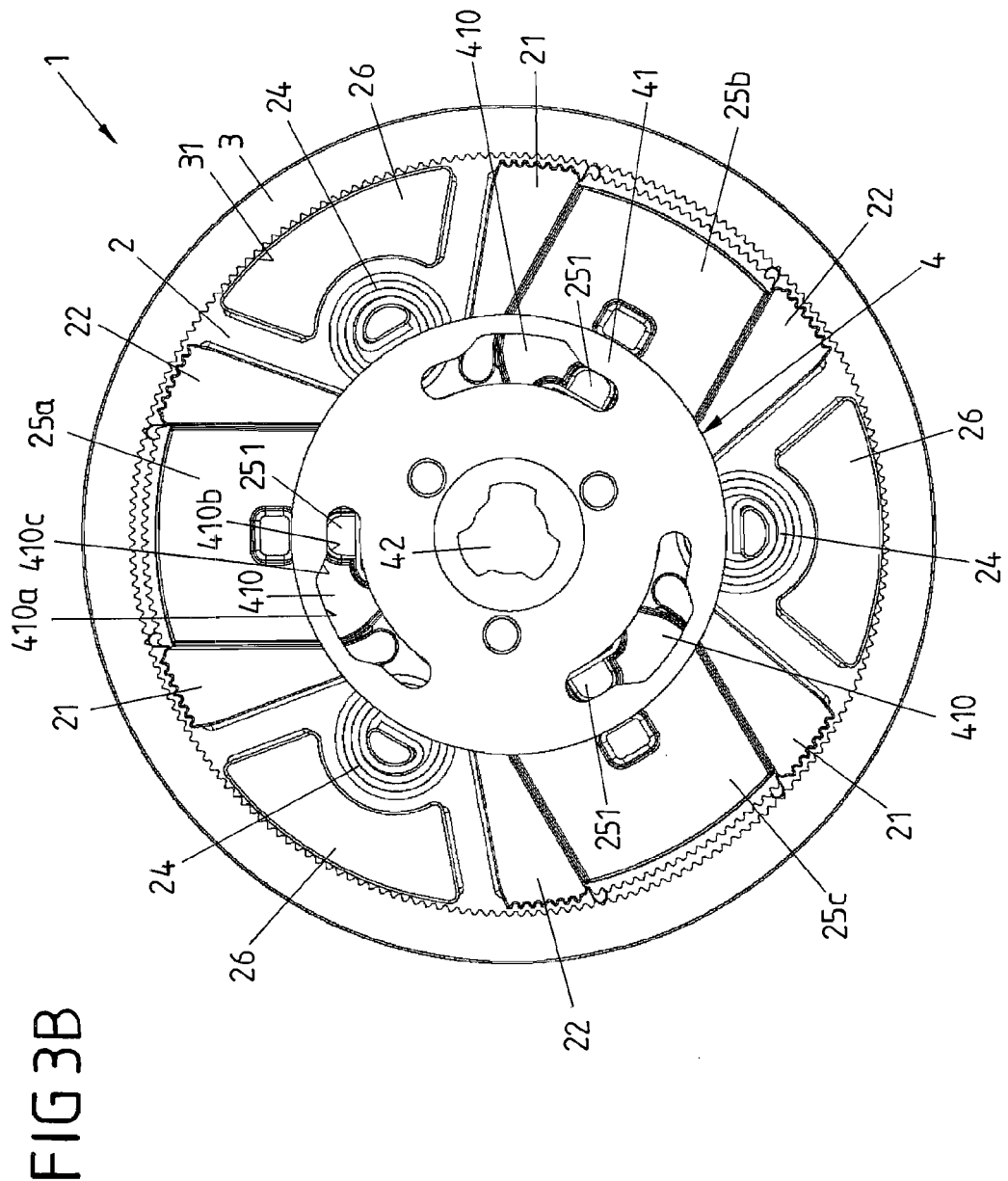
Figure 4:
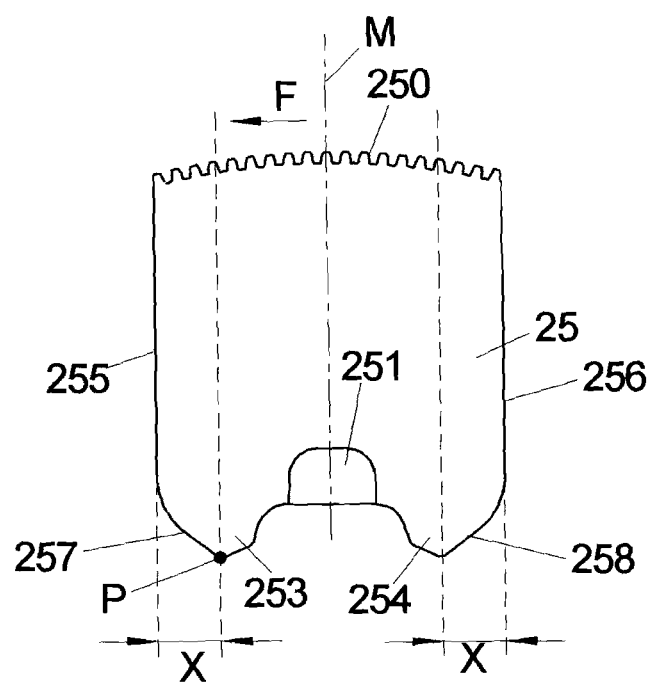

The idea of the present invention shall be explained in more detail in the following by the means of the embodiments illustrated in the Figures. It shows:

FIG. 1 a perspective partial sectional views of latch fitting;

FIG. 2A a sectional view of a latch fitting with three locking bolts arranged on a first fitting part in a not yet completely unlocked position without crank disc of the drive element;

FIG. 2B a sectional view of the latch fitting according to FIG. 2A however with a crank disc;

FIG. 3A a sectional view of the latch fitting according to FIGS. 2A and 2B however in an unlocked position without crank disc of the drive element;

FIG. 3B a sectional view of the latch fitting according to FIG. 3A however with crank disc and FIG. 4 a schematic view of a locking bolt.

FIG. 1 shows a partially sectional perspective view of an embodiment of a latch fitting 1, which can be for instance used in a seat adjustment for adjusting the slope of a seatback of a vehicle seat. Latch fittings 1 being identical in construction are thereby arranged on both sides of the backrest axial along a swivel axis of the backrest being mutually shifted and are connected to each other via a drive shaft extending along a rotational axis A. The latch fittings 1 serve the latching of the backrest relative to a seat part of the vehicle seat and keep the backrest in position to the seat part. The drive shaft connecting the latch fittings 1 with each other can be actuated via an actuator lever, thus the latching of the latch fittings 1 can be disconnected and the backrest can be adjusted.

The latch fitting 1 shown in FIG. 1 comprises a first fitting part 2 which is connected via a holding ring 5 arranged in a clamp manner on the first fitting part 2 pivotably about the rotational axis A to a second fitting part 3. The first fitting part 2 can be for instance connected to the seat part and the second fitting part 3 can be connected to the backrest when used for latching a backrest, wherein the pivot axis between backrest and seat part corresponds to the rotational axis A of the latch fitting 1.

Three locking bolts 25 being mutually shifted about the rotational axis A about 120° are arranged on the first fitting part 2 for latching, wherein said locking bolts are mounted movably via the guiding elements 21', 22' in a radial locking direction V on the first fitting part 2 and which can engage for latching the fitting part 1 via an external toothing 250 with a toothing 31 formed as an internal toothing on a circular section 33 of the second fitting part 3.

In the status shown in FIG. 1 the locking bolts 25 are in a position moved radially outwards, in which they engage with their toothing 250 into the toothing 31 of the second fitting part 3. In this status the fitting part 1 is latched so that the first fitting part 2 cannot be pivoted relative to the second fitting part 3.

In the embodiment according to FIG. 1 the guiding elements 21', 22' guiding the locking bolts 25 in radial direction are formed as projecting sections protruding in direction of the second fitting part 3 from a disc-like base body 20 and serve on the one hand the radial guidance of the locking bolts 25 and on the other hand the mounting of the first fitting part 2 on the second fitting part 3. For this, the guiding elements 21', 22' rest with their external sections 211', 221' against the toothing 31 of the second fitting part 3 formed as an internal toothing in a sliding manner so that the first fitting part 2 can be pivoted about the rotational axis relative to the second fitting part 3.

The latching of the latch fitting 1 is provided via the locking bolts 25, which are in the latched status engaged via the toothing 250 with the toothing 31 of the second fitting part 3. The actuation of the locking bolts 25 for latching the latch fitting 1 or for releasing the latching occurs thereby via a drive element 4 arranged between the first fitting part 2 and the second fitting part 3, which is formed in two pieces and consists of a disc-like crank disc 41 and a cam disk 43 arranged torque-proofed on the crank disc 41. The drive element 4 comprises a central receiving opening 42 for receiving a drive shaft reaching through the fitting parts 2, 3 at the recesses 27, 32.

Cranks 410 being identical in construction and mutually shifted about the rotational axis A about 120° are formed on the crank disc 41 of the drive element 4, into which in each case a pin 251 of a locking bolt 25 engages. The pin 251 rests in each case against an external edge section 410a, 410b of the crank 410 and slides when rotating the drive element 4 about the rotational axis A along said edge section 410a, 410b.

The projecting cam disc 43 formed in a protruding manner is arranged on the backside on the crank disc 41, wherein said cam disc forms a guiding contour 430 on its external circumference, which is in contact via a cam 252 formed in each case on the lower end of the locking bolt 25 with the locking bolts 25 mounted on the first fitting part 2.

In a latched status, in which the locking bolts 25 are moved radially outwards and engage via their toothing 250 with the toothing 31 of the second fitting part 3 so that the first fitting part 2 cannot be pivoted relative to the second fitting part 3, the pins 251 of the locking bolts 25 are in each case in abutment with a section 410a of the crank 410 being radially shifted outwards, and at the same time, the cams 252 of the locking bolts 25 rest in each case against a section of the guiding contour 430 being also shifted radially outwards. The locking bolts 25 are therefore kept in engagement with the toothing 31 of the second fitting part 3 via the driving element 4.

The drive element 4 is being pivoted about the rotational axis A—in case of the view according to FIG. 1 against clockwise direction—for actuating the locking bolts 25. Thereby, the pins 251 of the locking bolts 25 slide along the respective corresponding crank 410 and the cams 252 formed on the lower end of the locking bolt 25 move along the guiding contour 430 until the pin 251 is in abutment with a section 410b of the crank 41 being radially shifted inwards and the cam 252 is in abutment with a section of the guiding contour 430 being shifted radially inwards and thus, the locking bolt 25 is moved radially inwards.

In an unlocked status the locking bolts 25 are not anymore engaged with the toothing 31 of the second fitting part 3 so that the first fitting part 2 is unlocked from the second fitting part 3 and can be pivoted about the rotational axis A relative to the second fitting part 3.

As illustrated in FIG. 1 spring elements 24 are arranged on the first fitting part 2 in receptacles 23 and are kept via retainer elements 230 on the first fitting part 2. The spring elements 24 pretension the drive element 4 relative to the first fitting part 2 in direction of the latched status according to FIG. 1 so that the latch fitting 1 retains, if the drive element 4 is not being actuated, the locking bolts 25 in a latched position and the first fitting part 2 is locked relative to the second fitting part 3.

In case of the latch fitting 1 according to FIG. 1 the drive element 4 is mounted with a radial clearance to the rotational axis A (also designated as "floating mounting"). This mounting having a clearance of the drive element 4 shall ensure that in the locked position of the locking bolts 25 all locking bolts 25 are retained despite tolerance related deviation in their construction in complete engagement with the toothing 31 of the second fitting part 3 (what could not be ensured readily in case of a clearance-free mounting of the drive element 4, if the singular locking bolts 25 have tolerance-related deviations for instance in length).

The drive shaft reaches through the recesses 27, 32 on the first fitting part 2 or on the second fitting part 3 with clearance for the mounting having a clearance so that the drive shaft can radially move with clearance within the recesses 27, 32 and the drive element can be moved radially relative to the first and second fitting part 2, 3.

The mounting having a clearance entails however that optionally during an unlocking process of the latch fitting 1 the drive element 4 can move together with the locking bolts 25 in radial direction and possibly a locking bolt 25 already being disengaged with the toothing 31 of the second fitting part 3 for unlocking can again engage with the toothing 31 due to the radial movement of the assemblage consisting of drive element 4 and locking bolts 25. This can cause a ratcheting of the locking bolts 25 over the toothing 31 and optionally to a damaging of locking bolts 25 and/or toothing 31.

FIGS. 2A, 2B and FIGS. 3A, 3B show in cut-free views an embodiment of the latch fitting 1, in which guiding elements 21, 22 for guiding in each case a locking bolt 25a, 25b, 25c are provided on the first fitting part 2, which comprise on their ends 21B, 22B facing away from the toothing 31 of the second fitting part 3 (see FIG. 2A, having references in each case only in case of the guiding elements 21, 22 shown only in the top of the illustration) stops in form of curved end sections 212, 222, which limit the radial adjustment track of the locking bolts 25a, 25b, 25c radially inwards.

The guiding elements 21, 22 are formed as projecting sections protruding in axial direction on a disk-like base body 20 of the first fitting part 2. The guiding elements 21, 22 form in each case pairwise bolt guiding sections 210, 220 continuing parallel to each other, between which the locking bolts 25a, 25b, 25c are guided, wherein the first fitting part 2 is formed for receiving all of three locking bolts 25 so that the first fitting part 2 comprises a total of six guiding elements 21, 22.

The end sections 212, 222 forming the stops are adjacent to the bolt guiding sections 210, 220 and are curved towards each other in the plane crosswise to the rotational axis A—corresponding to the plane of projection in FIGS. 2A, 2B, 3A, 3B-, so that a guiding track formed between the bolt guiding sections 210, 220 for radial guidance of the locking bolts 25a, 25 b, 25c tapers radially inwards and is thereby limited radial inwards.

The end sections 212, 222 of the guiding elements 21, 22 forming the stops define an end position for the locking bolts 25a, 25b, 25c, in which the locking bolts 25a, 25b, 25c are moved radially inwards at a maximum and are removed from the toothing 31 of the second fitting part 3.

In the embodiment of the latch fitting 1 illustrated in FIGS. 2A, 2B, 3A, 3B the locking bolts 25a, 25b, 25c comprise on their end facing away from the toothing 31 of the second fitting part 3 two contact points 253, 254 in each case, with which the locking bolts 25a, 25b, 25c for actuation are in sliding abutment at the cam disk 43 of the drive element 4. The contact points 253, 254 are arranged in circumferential direction mutually shifted about the rotational axis A in the area of the lateral edges of the locking bolts 25a, 25b, 25c and thus realize a so called double contact point, which provides an advantageously support of the locking bolts 25a, 25b, 25c in the locked status of the latch fitting 1 in case of a loading acting in circumferential direction about the rotational axis A on the locking bolts 25a, 25b, 25c.

In the locked position of the latch fitting 1 the contact points 253, 254 of the locking bolts 25a, 25b, 25c are in abutment with cam sections 431, 432 of the cam disc 43 being shifted radially outwards and are there through pressed into engagement with the toothing 31 of the second fitting part 3.

When actuating the drive element 4 for unlocking the latch fitting 1 the drive element 4 consisting of the crank disc 41 and the cam disc 43 connected torque-proof to the crank disc 41 is rotated relative to the locking bolts 25a, 25b, 25c (in the views in FIGS. 2A, 2B against the clockwise direction). Through this, the pins 251 of the locking bolts 25a, 25b, 25c slide along the cranks 410 and at the same time the contact points 253, 254 slide along the external guiding contour 430 of the cam disc 43 and get into the area of sections 433, 434 of the guiding contour 430 of the cam disc 43 being shifted radially inwards so that they are not any longer pressed radially outwards by the cam disc 43. The pins 251 of the locking bolt 25a, 25b, 25c get from a section 410a of the respective corresponding crank 410 being shifted radially outwards via a comparatively steep running slope 410c into the area of a section 410b being shifted radially inwards so that the locking bolts 25a, 25b, 25c are pulled by the impact of the cranks 410 onto the pins 251 of the locking bolts 25a, 25b, 25c radially inwards and into disengagement with the toothing 31 of the second fitting part 3.

FIG. 2A, 2B show the latch fitting 1 in a position, in which the locking bolts 25a, 25b, 25c have been already pulled radially inwards by an adjustment track and the pins 251 have run from the section 410a being shifted radially outwards via the steep running slope 410c into the section 410b of the respective corresponding crank 410 being shifted radially inwards (see FIG. 2B). In this position, the locking bolts 25a, 25b, 25c are disengaged with the toothing 31 of the second fitting part 3 and therefore unlocked, wherein the drive element 4 has not yet reached its unlocked end position, in which the pins 251 rest against the end of the respective corresponding crank 410 of the crank disc 41 if looked at in circumferential direction (see FIG. 3B).

In the position shown in FIGS. 2A, 2B providing the end sections 212, 222 for limiting the adjustment track of the locking bolts 25a, 25b, 25c has the effect that a movement S of the drive element 4 is limited such that despite the radial floating mounting of the drive element 4 having a clearance none of the locking bolts 25a, 25b, 25c engages again with the toothing 31 of the second fitting part 3 due to the movement S.

If for instance due to an external load the drive element 4 and therewith the locking bolts 25a, 25b, 25c coupled to the drive element 4 via the crank disc 41 are moved downwards relative to the fitting parts 2, 3 (as shown in FIG. 2A), then the drive element 4 moves downwards and the locking bolts 25a, 25b, 25c move along their guiding tracks, although only so far until the locking bolt 25a arranged on the top in FIG. 2A gets into abutment with the end sections 212, 222 (see the upper circular mark in FIG. 2A) and counteracts through this a further movement of the assemblage consisting of drive element 4 and locking bolts 25a, 25b, 25c. In other words, the locking bolt 25a retains the drive element 4 and also the other locking bolts 25b, 25c during a movement S downwards and prevents that the locking bolts 25b, 25c can again engage with the toothing 31 of the second fitting part 3 (See the elliptical marks in the area of the toothing 250 of the locking bolts 25b, 25c).

By the means of the end sections 212, 222 it is therefore achieved that during an unlocking process the risk of a ratchet engagement of the locking bolts 25a, 25b, 25c with the toothing 31 is at least reduced despite the floating mounting of the drive element 4.

The end sections 212, 222 provide thus end stops for the locking bolts 25a, 25b, 25c on the first fitting part 2, which define an end position for the locking bolts 25a, 25b, 25c when moving radially inwards and thus provide a support of the assemblage consisting of drive element 4 and locking bolts 25a, 25b, 25c in an unlocked position of the latch fitting 1, which at least limits a radial movability of this assemblage.

If the drive element 4 is further rotated, the pins 251 of the locking bolts 25a, 25b, 25c slide along the section 410b of the cranks 410 being shifted radially inwards and get thus into the unlocked position as shown in FIGS. 3A, 3B, in which they have in each case reached the end of the corresponding crank 410 and are moved radially inwards.

The end sections 212, 222 are—as already mentioned—formed in a curved manner and as can be seen from FIGS. 2A, 3A are curved in the plane vertical to the rotational axis A towards each other such that the guiding track formed between the bolt guiding sections 210, 220 taper radially inwards. The locking bolts 25a, 25b, 25c have for sliding guidance along the bolt guiding sections 210, 220 longitudinal guiding sections 255, 256 to which curved abutment sections 257, 258 for abutment with the end sections 212, 222 of the guiding elements 21, 22 are adjacent. The abutment sections 257, 258 are arranged on the outside of the contact points 253, 255 and designed such that the locking bolts 25a, 25b, 25c taper inwards.

Providing the curved abutment section 257, 258 has the additional effect that lead-in slopes for applying the locking bolts 25a, 25b, 25c to the first fitting part 2 are formed, which elevate an assembly of the locking bolts 25a, 25b, 25c, in particular an insertion between the guiding elements 21, 22.

The end sections 212, 222 realizing the stops simplify furthermore an assembly insofar that the maximum insertion position of the locking bolts 25a, 25b, 25c is determined and thus applying the locking bolts 25a, 25b, 25c to the first fitting part 2 can occur in a simple manner without specific arrangements for holding the locking bolts 25a, 25b, 25c for connecting to the drive element 4.

In the unlocked position according to FIGS. 3A, 3B the movability of the drive element 4 in radial direction is additionally limited such that, as can be seen from FIG. 3A, the cam disc 43 of the drive element 4 is supported on the supporting sections 223 of the guiding elements 22 in radial direction. This support occurs in an indirect manner such that between the supporting sections 223 and the cam sections 431 spring ends 240 of spring elements 24 pretensioning the drive element 4 in direction of its locked position are clamped (see the circular marks in FIG. 3A).

The spring elements 24 engage having in each case one spring end 240 in the locked position of the drive element 4 with in each case one recess 435 on the cam disc 43 and are via this connected to the cam disc 43. When unlocking the latch fitting 1 the drive element 4 and therefore also the cam disc 43 are rotated relative to the locking bolts 25a, 25b, 25c as well as to the spring elements 24, whereby the cam sections 431 slide along the spring ends 240 and clamp these on the supporting section 223. In this manner, the cam disc 43 and furthermore therewith the drive element 4 are supported in radial direction on the guiding elements 22 and centred so that the mounting of the drive element 4 having a clearance is at least widely outweighed in the unlocked end position according to FIG. 3A.

In the position according to FIGS. 2A, 2B with additional support does not (yet) occur via the supporting sections 223 of the guiding elements 21. In this position, in which the drive element 4 has not reached yet its unlocked end position, the radial clearance is limited solely by the end sections 212, 222 of the guiding elements 21, 22 realizing the stops via which the assemblage consisting of locking bolts 25a, 25b, 25c and drive element 4 is retained by a radial movement.

In the embodiments according to FIGS. 2A, 2B, 3A, 3B three bearing elements 26 are provided being spatially separated and as separate projecting sections, which are mutually shifted by 120° and comprise in each case an external curved bearing section 260, which rests in case of an assembled latch fitting 1 (see FIG. 1) against the toothing 31 of the second fitting part 3 in a sliding manner. The first fitting part 2 is mounted via the bearing elements 26 about the rotational axis A pivotably to the second fitting part 3 and can, if the locking bolts 25a, 25b, 25c do not engage with the toothing 31 of the second fitting part 3, be pivoted relative to the second fitting part 3. The bearing elements 26 are mutually shifted by 120° and by 60° to the respective adjacent locking bolts 25a, 25b, 25c and thus arranged in a regular manner in circumferential direction about the rotational axis A with a distance on the first fitting part 2.

Furthermore, in the embodiments according to FIGS. 2A, 2B, 3A, 3B respective toothings 211, 221 are formed on external sections in the area of the ends 21A, 22A (see FIG. 2A) of the guiding elements 21, 22 facing the toothing 31 of the second fitting part 3, which do not engage under normal operation conditions of the latch fitting 1 with the toothing 31 of the second fitting part 3 (as described, the locking of the latch fitting 1 occurs under normal operations via the locking bolts 25a, 25b, 25c, which for latching the latch fitting 1 engage with the toothing 31 of the second fitting part 3 or for releasing the latching disengage with the toothing 31). The toothings 211, 221 serve to provide an additional support for instance in case of an accidental loading and come into engagement during a deformation of one or multiple of the bearing elements 26 with the toothing 31 of the second fitting part 3 in order to provide in this manner a traction between the fitting parts 2, 3 and to counteract a sudden adjustment of the fitting parts 2, 3 during an accidental loading.

In FIG. 4 a locking bolt 25 is shown in a schematic separated view as also being used in the latch fitting 1 according to the embodiment in FIGS. 2A, 2B, 3A, 3B. The locking bolt 25 comprises on its end facing the toothing 31 of the second fitting part 3 in the assembled status of the latch fitting 1 a toothing 250 and at its other end pointing radially inwards in the assembled status of the latch fitting 1 two contact points 253, 254 for realizing a double contact point for support on the cam disc 43 of the drive element 4. On in circumferential direction (in relation to the rotational axis A of the latch fitting 1 in the assembled status) lateral edges of the locking bolt 25 longitudinally extended straight lined guiding sections 255, 256 are formed for sliding abutment with the guiding elements 21, 22 of the first fitting part 2, to which the abutment sections 257, 258 on the end of the locking bolt 25 being directed radially inwards are adjacent.

In case of the locking bolt 25 the contact points 253, 254 are shifted in circumferential direction to the rotational axis A relative to the guiding sections 255, 256 by a distance X inwards in direction of a centre line M of the locking bolt 25 (the centre line M continues in assembled latch fitting 1 in radial direction to the rotational axis A). The contact points 253, 254 are thereby arranged on both sides of the centre line M on the radial internal end of the locking bolt 25 approximately in the centre (looked at in circumferential direction) between the pin 251 arranged on the centre line M (which serves the form fit engagement with the crank disc 41 of the drive element 4) and the lateral guiding sections 255, 256.

Due to the arrangement of the contact points 253, 254 being shifted in circumferential direction inwards the lever ratios for supporting the locking bolt 25 on the cam disc 43 of the drive element 4 can be optimized. In case of a force F acting on the locking bolt 25 in circumferential direction and striking the toothing 250 of the locking bolt 25 a lever arm is provided about a rotational point P of the contact point 253 resting against the cam disc 43 shown left in FIG. 4 and a support of the force F is provided in circumferential direction via the guiding element 21 resting against the guiding section 255 (see FIGS. 2A, 3A).

Since the contact points 253, 254 are shifted inwards in circumferential direction it is furthermore provided that a support of the locking bolt 25 on the cam disc 43 does not occur via its corner areas but via points or areas being shifted inwards in circumferential direction. Through this, the surface pressure of the locking bolt 25 on the cam disc 43 can be beneficially designed via the contact points 253, 254. When tilting, no loading in direction of a "roll motion" via a corner of the locking bolt 25 occurs, which would optionally unbeneficially stress the respectively effected corner area.

The present invention is previously described in respect to one embodiment of a latch fitting with three locking bolts, which realize in each case a double contact point. The invention is, however, also basically applicable for latch fittings with another number of locking bolts and also in combination with locking bolts, which comprise solely one contact point for sliding abutment with a drive element.

It is also conceivable to realize the stops not by curved end sections, but for instance by angular steps or alike on the guiding elements.

LIST OF REFERENCE SIGNS

1 Latch fitting
2 First fitting part
20 Base body
21, 22, 21', 22' Guiding element
21A, 21B, 22A, 22B End
210, 220 Bolt guiding section
211, 221 Toothing
211', 221' Section
212, 222 End section
213, 223 Support section
23 Receptacle
230 Retainer element
24 Spring element
240 Spring end
25 Locking bolt
250 Toothing
251 Pin
252 Cam
253, 254 Contact point
255, 256 Guiding section
257, 258 Abutment section
26 Bearing element
260 Bearing section
27 Recess
3 Second fitting part
31 Toothing
32 Recess
33 Annual section
4 Drive element
41 Crank disc
410 Crank
410a Crank section shifted radially outwards
410b Crank section shifted radially inwards
410c Slope
42 Receiving opening
43 Cam disc
430 Guiding contour
431, 432 Cam section shifted radially outwards
433, 434 Section shifted radially inwards
435 Recess
5 Holding ring
A Rotational axis
F Force
M Centre line
P Rotational point
S Movement
V Locking direction
X Distance

The invention claimed is:

1. A latch fitting for locking two vehicle components, comprising:
a first fitting part,
a second fitting part which is rotatably arranged about a rotational axis relative to the first fitting part and on which a toothing is formed,
multiple locking bolts movably arranged on the first fitting part,
longitudinally extended guide elements arranged on the first fitting part, wherein each locking bolt is guided along an adjustment track on said guide elements, wherein each guide element comprises an end facing the toothing of the second fitting element and an end facing away from the toothing of the second fitting element, and
a drive element coupled to each locking bolt, wherein said drive element is designed to move each locking bolt along the associated adjustment track in a locking direction in order to engage the locking bolt for locking the latch fitting with the toothing of the second fitting part, and to move each locking bolt against the locking direction in order to disengage the locking bolt for unlocking the latch fitting from the toothing of the second fitting part,
wherein each guide element comprises a stop at the end facing away from the toothing of the second fitting part for limiting the adjustment track of the at least one locking bolt when moving the associated locking bolt against the locking direction,
wherein two guide elements are assigned to each locking bolt, the two guide elements each comprising a bolt guiding section extending in parallel with respect to each other, the locking bolt being guided between said bolt guiding sections,
wherein the stop is formed by a curved end section adjoining the bolt guiding section of each guide element for abutment with the associated locking bolt, such that a guiding track formed between the guide elements is tapered towards the ends of the guide elements facing away from the toothing, wherein the guiding track comprises a first width between the bolt guiding sections extending in parallel which is larger than a second width between the stops formed by the curved end sections at the ends of the guide elements facing away from the toothing, and
wherein each locking bolt comprises at lateral edges two guiding sections extending in parallel to each other for interacting with the two guide elements receiving the locking bolt in-between them, wherein an abutment section adjoins each guiding section for abutment with the stop of the associated guide element at an end of the at least one locking bolt facing away from the toothing of the second fitting part.

2. A latch fitting according to claim 1, wherein the end sections are at least sectionally curved.

3. A latch fitting according to claim 1, wherein the abutment section is at least sectionally formed in a curve.

4. A latch fitting according to claim 1, wherein the abutment sections provide lead-in slopes for the assembly of the locking bolt on the first fitting part.

5. A latch fitting according to claim 1, wherein the drive element is arranged with radial clearance relative to the rotational axis on the first fitting part and/or the second fitting part, wherein the radial clearance of the drive element is limited when at least one of the locking bolts is in abutment with an assigned stop of at least one guide element.

6. A latch fitting according to claim 1, wherein each locking bolt comprises two contact points being mutually shifted in circumferential direction about the rotational axis, wherein said points interact for actuating each locking bolt with a cam disc of the drive element.

7. A latch fitting according to claim 6, wherein the contact points of each locking bolt are arranged at the end of the locking bolt facing away from the toothing of the second fitting part and are adjacent to abutment sections for abutment with the stops of the associated guide elements.

8. A latch fitting according to claim 6, wherein each contact point is positioned, when viewed in a circumferential direction, at a distance from the lateral guiding sections of the locking bolt.

9. A latch fitting according to claim 6, wherein each contact point is arranged in circumferential direction approximately centred between an actuating element for coupling the locking bolt to the drive element and a lateral guide section.

* * * * *